United States Patent [19]
Amekawa

[11] Patent Number: 6,075,094
[45] Date of Patent: Jun. 13, 2000

[54] METHYL METHACRYLIC RESIN COMPOSITION, MOLDED ARTICLE COMPRISING THE SAME AND PRODUCTION OF THE MOLDED ARTICLE

[75] Inventor: Yoshihide Amekawa, Niihama, Japan

[73] Assignee: Sumitomo Chemical Company, Ltd., Osaka, Japan

[21] Appl. No.: 09/131,335

[22] Filed: Aug. 7, 1998

[30] Foreign Application Priority Data

Aug. 7, 1997 [JP] Japan ................................. 9-212942
Mar. 23, 1998 [JP] Japan ................................. 10-073917

[51] Int. Cl.⁷ .................................................. C08F 265/04
[52] U.S. Cl. ............................ 525/305; 525/306; 525/308
[58] Field of Search ..................... 525/305, 306, 525/307, 308, 309, 310

[56] References Cited

U.S. PATENT DOCUMENTS

| | | |
|---|---|---|
| 4,396,377 | 8/1983 | Roemer et al. . |
| 4,396,476 | 8/1983 | Roemer et al. . |
| 4,698,373 | 10/1987 | Tateosian et al. . |
| 4,873,269 | 10/1989 | Nakazato . |
| 4,963,624 | 10/1990 | Ida ........................... 525/309 |
| 5,004,785 | 4/1991 | Ida ........................... 525/305 |
| 5,705,552 | 1/1998 | Minghetti ................. 524/437 |
| 5,880,207 | 3/1999 | Delphin .................... 524/523 |

FOREIGN PATENT DOCUMENTS

| | | |
|---|---|---|
| 0014515A2 | 8/1980 | European Pat. Off. . |
| 0270915A2 | 6/1988 | European Pat. Off. . |
| 62-2201 | 1/1987 | Japan . |
| 62-79206 | 4/1987 | Japan . |
| 7-70236 | 3/1995 | Japan . |
| WO 8202556A1 | 8/1982 | WIPO . |
| WO 9714749A1 | 4/1997 | WIPO . |

Primary Examiner—Paul R. Michl

[57] ABSTRACT

A methyl methacrylic resin composition comprising:

(A) 30 to 60% by weight of an unsaturated monomer mixture comprising an unsaturated monomer having at least two double bonds which can effect radical polymerization, (B) 40 to 70% by weight of resin particles made of a polymer of a methyl methacrylic unsaturated monomer comprising (i) 20 to 100 parts by weight of partially cross-linked resin particles and (ii) 0 to 80 parts by weight of uncross-linked resin particles and (C) 0.1 to 5% by weight of a radical polymerization initiator, is provided. The resin composition has an excellent handling property, generates little odor, and can be easily molded. The methyl methacrylic resin composition gives a molded article which has a high transparency, a high hardness of the surface and an excellent scratch-resistance. The molded article may be preferably used as a lamp cover.

21 Claims, No Drawings

METHYL METHACRYLIC RESIN COMPOSITION, MOLDED ARTICLE COMPRISING THE SAME AND PRODUCTION OF THE MOLDED ARTICLE

TECHNICAL FIELD OF THE INVENTION

The present invention relates to a methyl methacrylic resin composition, a molded article comprising the composition and a method of producing the molded article.

BACKGROUND OF THE INVENTION

Methyl methacrylic resins containing methyl methacrylate as a main component have found applications in variety of fields such as lighting apparatuses, parts for automobiles, billboards and construction materials, since the resin is advantageous in regards to transparency, luster on the surface and the like.

The methyl methacrylic resins are not always sufficient in view of scratch-resistance and hardness of the surface. To improve the scratch-resistance, a variety of methods such as a method of applying or laminating a hard-coat layer to the resin surface, has been conducted to prevent scratching. However, these methods consist of many steps before obtaining the products and, are therefore unnecessarily costly for industrial production.

On the other hand, methods wherein methyl methacrylic resin compositions are obtained by cross-linking the resin itself have been proposed for improving the scratch-resistance of the molded article thereof.

For example, the Japanese Patent Laid-Open No. 6-62380-B (corresponding to the U.S. Pat. No. 4,698,373) discloses prosthetic teeth (i) made of a hardened polymer made of composition containing a blend of (a) from 0% to about 50% by weight of an uncross-linked polymer solution, (b) from about 2% to about 30% by weight of a polymerizable monomer, (c) from about 10% to about 70% of a cross-linked polymer in the form of discrete particles having average diameters from about 0.001 micron to about 500 microns and being swollen in said solution and (d) from 20% to about 70% of a cross-linking agent for said monomer, provided that when the component (d) is of from 20% to 27%, the component (b) is of 20% or less and that the above percentages are based on the total weight of components (a), (b), (c) and (d) in said composition; (ii) possessing a superior chemical resistance against methyl methacrylate; and (iii) having a grind-resistance value from 450 to 550 g/sec. It discloses a use of the above-mentioned methyl methacrylic resin composition which somewhat improves the scratch-resistance thereof. The resin composition is used for prosthetic teeth which are made of a stable one part dental prosthesis composition employing an IPN technology.

Additionally, various methods for obtaining alkyl methacrylic resin compositions such as methyl methacrylic resin compositions have been proposed.

For example, the Japanese Patent Application Laid-Open No. 62-2201-A discloses a methyl methacrylic resin composition obtained by cross-linking the resin itself such that the resin composition is obtained by polymerizing a mixture which comprises (a) resin raw materials selected from an alkyl methacrylate monomer, an $\alpha,\beta$-ethylenic unsaturated monomer mixture containing mainly alkyl methacrylates, and a syrup containing a polymer thereof, and (b) 12 to 40 parts by weight of a cross-linking agent based on 100 parts by weight of the resin raw materials. It discloses the resin composition is used for production of a lens for lamp having a thermal deformation temperature of 130° C. or more.

The Japanese Patent Application Laid-Open No. 62-79206-A discloses another methyl methacrylic resin composition obtained by cross-linking the resin itself, and discloses that methacrylic resin moldings are produced by molding partially-crosslinked gel-like polymer prepared by polymerizing partially mixtures of 100 parts by weight of (a) resin raw materials selected from an alkyl methacrylate monomer, an $\alpha,\beta$-ethylenic unsaturated monomer mixture containing mainly alkyl methacrylates, and a syrup containing a polymer thereof, and (b) 2 to 250 parts by weight of a cross-linking agent based on 100 parts by weight of the resin raw materials, wherein the total amounts of the polymers contained in crosslinked polymers are not more than 80 weight % and they are 4 to 65 weight % more than the amounts of the polymers contained in the said mixture of (a) and (b), by a injection molding method, a compression molding method or a transition molding method.

The Japanese Patent Application Laid-Open No. 7-70236-A also discloses another methyl methacrylic resin composition obtained by cross-linking the resin itself, and discloses thermosetting resin compositions containing (i) partially crosslinked gel-like polymers prepared by polymerising (a) monomers containing mainly alkyl methacrylates or syrups thereof and (b) at least two (meth)acryloyl groups-containing compounds and (ii) peroxides containing mainly peroxy-ketals having exothermic peak temperature of at least 110° C. and below 130° C. in amount of 0.05–0.2% in terms of active oxygen.

However, in the Japanese Patent Application Laid-Open No. 6-62380-A, the objects of the invention are that the methyl methacrylic resin composition is used for prosthetic dental appliances such as prosthetic teeth and, therefore, it is suggested that the component is used with pigments and fillers to improve the appearance, the density and the physical properties of the desirable prosthetic teeth, and is not needed that the article made of the resin composition has high transparency.

In all of the Japanese Patent Application Laid-Open Nos. 62-2201-A, 62-79206-A and 7-70236-A, the method of partially polymerizing the methyl methacrylic resin components in the composition are carried out. In such a method, the reaction conditions such as temperature and time have to be elaborately controlled since the content of the polymer is likely to vary widely and this amount of scattering in the content may cause troubles when the composition are molded. Additionally, even once the polymerization reaction is terminated, the reaction might be started again by the remaining polymerization initiator resulting in an unintended composition when the resin composition is transported or is stocked as it is. Special apparatuses or facilities such as an apparatus for keeping cold are needed since a preservative property is not enough and, therefore, the method is disadvantageous, industrially.

SUMMARY AND OBJECTS OF THE INVENTION

The present inventor has intensively investigated regarding a methyl methacrylic resin composition having little amount of scattering in the content and an excellent preservative property and being capable of giving a molded article which has a high transparency, a high hardness of the surface and an excellent scratch-resistance. As a result, it has been found that a specific methyl methacrylic resin composition comprising the components of (A) a certain amount of an unsaturated monomer mixture comprising an unsaturated monomer having at least two double bonds which can effect radical polymerization, (B) a certain amount of resin particles made of a polymer of a specific methyl methacrylic unsaturated monomer, and (C) a certain amount of a radical polymerization initiator, has little amount of scattering in the content and an excellent preservative property, and is able to give a molded article which has a high transparency, a high hardness of the surface and an excellent scratch-resistance.

Thus, the present invention provides a methyl methacrylic resin composition comprising (A) 30 to 60% by weight of an unsaturated monomer mixture comprising an unsaturated monomer having at least two double bonds which can effect radical polymerization, (B) 40 to 70% by weight of resin particles made of a polymer of a methyl methacrylic unsaturated monomer comprising (i) 20 to 100 parts by weight of partially cross-linked resin particles and (ii) 0 to 80 parts by weight of uncross-linked resin particles, wherein the total amount of the partially cross-linked resin particles and the uncross-linked resin particles adds up to 100 parts by weight and (C) 0.1 to 5% by weight of a radical polymerization initiator, wherein the amount of each of components (A), (B) and (C) is based on the total amount of components (A) and (B).

The present invention further provides a molded article, especially a lamp cover, obtained by polymerizing and curing said methyl methacrylic resin composition.

The present invention still further provides a method for producing a molded article, comprising the steps of mixing components (A), (B) and (C) to obtain a material for molding, and heating and curing the material for molding.

DETAILED DESCRIPTION OF THE INVENTION

The methyl methacrylic resin composition of the present invention comprises the components of:

(A) 30 to 60% by weight of an unsaturated monomer mixture comprising an unsaturated monomer having at least two double bonds which can effect radical polymerization, (B) 40 to 70% by weight of resin particles made of a polymer of a methyl methacrylic unsaturated monomer comprising (i) 20 to 100 parts by weight of partially cross-linked resin particles and (ii) 0 to 80 parts by weight of uncross-linked resin particles, wherein the total amount of the partially cross-linked resin particles and the uncross-linked resin particles adds up to 100 parts by weight and (C) 0.1 to 5% by weight of a radical polymerization initiator, wherein the amount of each of components (A), (B) and (C) is based on the total amount of components (A) and (B).

The unsaturated monomer mixture comprising an unsaturated monomer having at least two double bonds which can effect radical polymerization, which is used as component (A) in the present invention, is preferably a mixture of an unsaturated monomer having at least two double bonds which can effect radical polymerization and an unsaturated monomer copolymerizable with said unsaturated monomer. Hereinafter, the unsaturated monomer having at least two double bonds which can effect radical polymerization is called "a polyfunctional unsaturated monomer", and the unsaturated monomer copolymerizable with the polyfunctional unsaturated monomer is called "a monofunctional unsaturated monomer". The unsaturated monomer mixture preferably contains about 50% by weight or more, more preferably about 55% by weight or more, of said polyfunctional unsaturated monomer.

Examples of the polyfunctional unsaturated monomer include allyl methacrylate, ethylene glycol di(meth)acrylate, diethylene glycol di(meth)acrylate, triethylene glycol di(meth)acrylate, polyethylene glycol di(meth)acrylate, polypropylene glycol di(meth)acrylate, 1,3-butylene glycol di(meth)acrylate, 1,6-hexane diol di(meth)acrylate, neopentyl glycol di(meth)acrylate, divinylbenzene, diallyl phthalate, trimethylolpropane tri(meth)acrylate, tetramethylolmethane tri(meth)acrylate, tetramethylolmethane tetra (meth)acrylate, and the like. Here, the term "(meth)acrylate" represents both acrylate and methacrylate, and hereinafter, the term "(meth)" has an analogous meaning indicating the optional presence of a methyl substituent.

Among them, a polyfunctional unsaturated monomer having at least two methacryloxy groups as a double bond which can effect radical polymerization is preferred since the polyfunctional unsaturated monomer reacts readily with an unsaturated monomer copolymerizable with said polyfunctional unsaturated monomer and, therefore, there remains only a little amount of unsaturated monomer which has not reacted in the curing reaction thereof. Among these, neopentyl glycol dimethacrylate is one of the most preferred examples. The polyfunctional unsaturated monomer can be used independently or in combination of two or more.

In the present invention, the monofunctional unsaturated monomer can be used with the polyfunctional unsaturated monomer and is not restricted as long as it has the copolymerizable property, and can be appropriately selected for use. Example of the monofunctional unsaturated monomer include esters of methacrylic acid or acrylic acid with aliphatic, aromatic or alicyclic alcohols, such as methyl (meth)acrylate, ethyl (meth)acrylate, propyl (meth)acrylate, butyl (meth)acrylate, 2-ethylhexyl (meth)acrylate, lauryl (meth)acrylate, tetrahydrofurfuryl (meth)acrylate, isobornyl (meth)acrylate, benzyl (meth)acrylate and cyclohexyl (meth)acrylate; (meth)acryl-based monomers such as hydroxyalkyl esters such as hydroxyethyl (meth)acrylate, hydroxypropyl (meth)acrylate and hydroxybutyl (meth) acrylate; unsaturated acids such as acrylic acid and methacrylic acid; styrene-based monomers such as styrene and α-methylstyrene; unsaturated nitriles such as acrylonitrile and methacrylonitrile; and monofunctional unsaturated monomers such as maleic anhydride, phenylmaleimide, cyclohexylmaleimide and vinyl acetate. Among them, esters of methacrylic acid are preferred.

In the present invention, the above-mentioned monofunctional unsaturated monomer and/or polyfunctional unsaturated monomer can also be used with dissolving a homopolymer thereof and/or co-polymer thereof.

The methyl methacrylic resin composition of the present invention comprises about from 30 to about 60% by weight, preferably about from 40 to about 55% by weight, of the unsaturated monomer mixture component (A) based on the total amount of components (A) and (B). When the content of the unsaturated monomer mixture component (A) is less than about 30% by weight, sufficient moldability is not obtained in molding the resin composition. On the other hand, when the content is over about 60% by weight, stickiness of a material to be molded which is obtained after kneading the resin composition is high and it is difficult to keep the form after kneading and, therefore, handling in both cases is not good, undesirably. In addition to that, when the content is over about 60% by weight, it is difficult to obtain a molded article having a flat surface, undesirably, since a shrinkage of the molded article due to the polymerization becomes large.

The methyl methacrylic resin composition of the present invention comprises from about 40 to about 70% by weight of resin particles of component (B) made of a polymer of a methyl methacrylic unsaturated monomer, based on the total amount of components (A) and (B), which comprise (i) partially cross-linked resin particles and (ii) uncross-linked resin particles. The resin particles of component (B) made of a polymer of a methyl methacrylic unsaturated monomer are made from a copolymer comprising a methyl methacrylate monomer and an unsaturated monomer copolymerizable with methyl methacrylate, or the copolymer and a homopolymer of methyl methacrylate, and the resin particles are preferably made from about 50% by weight or more, more preferably about 80% by weight or more, of methyl methacrylate based on the resin particles.

Examples of the unsaturated monomer copolymerizable with methyl methacrylate include the same monofunctional unsaturated monomers and the same polyfunctional unsaturated monomers as mentioned above.

Specific examples of the polyfunctional unsaturated monomers which are used as the unsaturated monomer copolymerizable with methyl methacrylate include, but are not limited to, allyl methacrylate, ethylene glycol di(meth)acrylate, diethylene glycol di(meth)acrylate, triethylene glycol di(meth)acrylate, polyethylene glycol di(meth)acrylate, polypropylene glycol di(meth)acrylate, 1,3-butylene glycol di(meth)acrylate, 1,6-hexane diol di(meth)acrylate, neopentyl glycol di(meth)acrylate, divinylbenzene, diallyl phthalate, trimethylolpropane tri(meth)acrylate, tetramethylolmethane tri(meth)acrylate, tetramethylolmethane tetra(meth)acrylate, and the like.

Specific examples of the monofunctional unsaturated monomer include, but are not limited to, esters of methacrylic acid or acrylic acid with aliphatic, aromatic or alicyclic alcohols, such as methyl acrylate, ethyl (meth)acrylate, propyl (meth)acrylate, butyl (meth)acrylate, 2-ethylhexyl (meth)acrylate, lauryl (meth)acrylate, tetrahydrofurfuryl (meth)acrylate, isobornyl (meth)acrylate, benzyl (meth)acrylate and cyclohexyl (meth)acrylate; (meth)acryl-based monomers such as hydroxyalkyl esters such as hydroxyethyl (meth)acrylate, hydroxypropyl (meth)acrylate and hydroxybutyl (meth)acrylate; unsaturated acids such as acrylic acid and methacrylic acid; styrene-based monomers such as styrene and α-methylstyrene; unsaturated nitriles such as acrylonitrile and methacrylonitrile; and monofunctional unsaturated monomers such as maleic anhydride, phenylmaleimide, cyclohexylmaleimide and vinyl acetate.

When component (B) is made, the unsaturated monomer of which component (B) is composed can be used with dissolving a homo-polymer thereof and/or co-polymer thereof in the same way as mentioned regarding component (A).

The resin particles used as component (B) in the present invention are, for example, resin particles obtained by polymerization such as emulsion polymerization, suspension polymerization and dispersion polymerization, and resin particles obtained by grinding a resin polymer, which is obtained by other polymerization, into pieces.

An average particle size of the resin particles, especially that of partially cross-linked resin particles, is usually in the range of about 1 to about 100 μm. The size can be controlled by conducting a suitable polymerization method which is mentioned above. When resin particles having a particle size less than about 1 μm are used, it tends to be difficult to mix or knead the resin particles with the unsaturated monomer mixture of component (A). On the other hand, when resin particles having a particle size over about 100 μm are used, the form of the particles tends to be noticeable after molding.

The resin particles of component (B) comprise (i) from about 20 to about 100 parts by weight of partially cross-linked resin particles and (ii) from 0 to about 80 parts by weight of uncross-linked resin particles, wherein the total amount of the partially cross-linked resin particles and the uncross-linked resin particles adds up to 100 parts by weight. When the ratio of the partially cross-linked resin particles accounts for less than about 20 parts by weight in the total amount of the resin particles adding up to 100 parts by weight, the stickiness of the composition is high, and the handling property deteriorates.

The ratio of the partially cross-linked resin particles accounting for about 20 to about 100% by weight of component (B) and the ratio of the uncross-linked resin particles accounting for 0 to about 80% by weight of component (B), each being based on the total amount of these resin particles, can be appropriately selected depending on the use of the molded article to be obtained, provided that these ratios falls in the each above-mentioned range. Among these, the ratio of the partially cross-linked resin particles is preferably from about 50 to about 100% by weight.

The partially cross-linked resin particles in the present invention swell and are not completely dissolved in solvents in which polymethylmethacrylate can be dissolved, such as acetone.

The partially cross-linked resin particles can be obtained, for example, by adding the polyfunctional unsaturated monomer when a mixture of about 50% by weight or more of methylmethacrylate and an unsaturated monomer copolymerizable with methylmethacrylate is polymerized to obtain resin particles thereof or of a polymer thereof.

The resin particles of component (B) are contained in the present resin composition in an amount of about 40 to about 70% by weight, preferably about 45 to about 60% by weight, based on the total amount of compounds (A) and (B). When the amount is less than about 40% by weight, stickiness of a material to be molded which is obtained after kneading the resin composition is high and it is difficult to keep the form after kneading and, therefore, handling is not good, undesirably. On the other hand, when the amount is more than about 70% by weight, it is difficult to uniformly mix or knead the resin composition, undesirably.

The resin particles can optionally contain agents such as an antioxidant, an ultraviolet-ray absorbing agent, a chain transfer agent, a releasing agent, a flame retardant and a dye, and these agents can be used in the resin composition of the present invention.

A radical polymerization initiator is used as component (C) in the resin composition of the present composition, and it effects polymerization and curing of the unsaturated monomer mixture component (A).

Examples of the radical polymerization initiator include azo compounds such as 1,1'-azobis(cyclohexane-1-carbonitrile), 2,2'-azobis(2,4,4-trimethylpentene), 2,2'-azobis(2-methylpropane), 2-cyano-2-propylazoformamide, 2,2'-azobis(2-hydroxymethylpropionate), 2,2'-azobis(2-methyl-butyronitrile), 2,2'-azobisisobutyronitrile, 2,2'-azobis[2-(2-imidazolin- 2-yl)propane] and dimethyl-2,2-azobis(2-methylpropionate); diacyl and/or dialkyl peroxide-based initiators such as dicumyl peroxide, t-butylcumyl peroxide, di-t-butyl peroxide, benzoyl peroxide and lauroyl peroxide; peroxy ester-based initiators such as t-butyl peroxy-3,3,5-trimethyl hexanoate, t-butyl peroxyl laurate, t-butyl peroxy isobutyrate, t-butyl peroxy acetate, di-t-butyl peroxyhexahydro terephthalate, di-t-butyl peroxy azelate, t-butyl peroxy-2-ethyl hexanoate, 1,1,3,3-tetramethylbutyl peroxy-2-ethyl hexanoate and t-amyl peroxy-2-ethyl hexanoate; percarbonate-based initiators such as t-butyl peroxy allyl carbonate and t-butyl peroxyisopropyl carbonate; and peroxy ketal-based initiators such as 1,1-di-t-butyl peroxycyclohexane, 1,1-di-t-butyl peroxy-3,3,5-trimethylcyclohexane and 1,1-di-t-hexyl peroxy-3,3,5-trimethylcyclohexane. These radical polymerization initiators can be used independently or in combination of two or more.

When a polymerization initiator which decomposes even at low temperature is used, it may cause the radical polymerization in mixing the resin composition or in storage after the mixing and, therefore, a polymerization initiator having a decomposition temperature such that a 10-hour half-life temperature is about 60° C. or higher is preferably used in the present invention. On the other hand, a polymerization initiator having a decomposition temperature such that a 10-hour half-life temperature is over about 100° C. is not industrially preferable, since it needs high temperature or much time for a curing reaction of the unsaturated monomer mixture component (A) which is described later in detail. Therefore, a polymerization initiator having a decomposition temperature such that a 10-hour half-life temperature is in the range of about 60 to about 100° C. is preferably used, and by using such a polymerization initiator, both an excellent preservative property of the resin composition, and desirable temperature and time for the curing reaction can be achieved at the same time.

The radical polymerization initiator component (C) is contained in the present resin composition in an amount of about 0.1 to about 5% by weight, preferably about 0.1 to about 2% by weight, based on the total amount of components (A) and (B). When the amount is less than about 0.1% by weight, the radical polymerization requires long period of time, and when the amount is more than about 5% by weight, the unsaturated monomer mixture component (A) can not be polymerized steadily.

The resin composition of the present invention can further contain a releasing agent, an ultraviolet-ray absorbing agent, a dye, a pigment, a polymerization inhibitor, a chain transfer agent, an antioxidant, a flame retardant, a reinforcing agent and the like. For example, an ultraviolet-ray absorbing agent can be contained in the methyl methacrylic resin composition of the present invention in amount of about 10 to about 1000 ppm based on the total amount of components (A), (B) and (C).

The present invention also provides a method for producing a molded article using the methyl methacrylic resin composition.

The method for producing the molded article comprises steps of (i) mixing and aging the methyl methacrylic resin composition of the present invention, and (ii) polymerizing and curing the resulting composition.

In the step of the mixing and aging the methyl methacrylic resin composition, components (A), (B) and (C) are mixed to obtain a final uniform resin composition.

Specific examples of the step include a step such that components (A), (B) and (C) are mixed to obtain a slurry of the resin composition, then the slurry is aged in an appropriate vessel.

A shape of the vessel is not particularly restricted. Examples of the vessel include a cell composed of at least two flat plates facing each other and a sealing material. A material of the vessel is not particularly restricted, provided that it is not dissolved in or is not corroded by component (A) or (C).

The resin composition mixed may be enclosed in a vessel, and heated for aging. During the aging, the unsaturated monomer mixture component (A) may be impregnated into the resin particles component (B) and the uncross-linked resin particles in the component (B), when it is used, may be dissolved in the unsaturated monomer mixture component (A). An appearance of the resin composition usually changes from a slurry form to a clay form during the aging, and the resin composition after the aging, which is a soft material, can be used as a material to be molded.

The aging temperature preferably falls in the range of about 20° C. to about 80° C. When the mixed resin composition is heated over about 80° C., undesirable polymerization and curing reaction may occur due to the added radical polymerization initiator. When the mixed resin composition is aged at a temperature lower than about 20° C., the aging requires an undesirable length of time.

The aging conditions, except the temperature, are chosen according to the resin composition, especially to the kind of the resin particles component (B), the composition of the unsaturated monomer mixture component (A), the kind of the radical polymerization initiator component (C) and the like.

For example, the mixing and the heating of the resin composition can be conducted at the same time by selecting an appropriate temperature when the mixing and the aging of the resin composition are carried out. At that time, a known kneading apparatus such as a 2-axis extruder, an almighty mixing apparatus, a kneader and a banbury mixer can be used as a kneading apparatus.

After the mixing and aging step, a material to be molded is obtained. This material is soft and, therefore, has excellent handling property. The material can be easily processed and desirably shaped. For example, the material can be handled in various forms such as sheet, block, cake, rod, pellet, ribbon and strand.

That is, after the mixing and aging step, polymerizing and curing steps are conducted, and the above-mentioned material to be molded may be thrown into a mold of various shapes, pressed, heated, shaped and cured to obtain molded articles of various forms.

When a curing reaction by a radical polymerization reaction is conducted in the present invention, a reaction temperature from about 80 to about 160° C. is preferable. When the temperature is lower than about 80° C., the curing reaction requires a long period of time and is industrially disadvantageous. On the other hand, when the temperature is over about 160° C., decomposition and coloration may occur, undesirably.

Any method of molding can be used as long as the material to be molded is pressed, heated, shaped and cured. Examples thereof include press molding, injection molding, transfer molding and the like.

When press molding is carried out, a press molding apparatus comprising a pressure-applying unit and a mold may be used. Temperature of a mold in press molding is preferably controlled to be in the range of about 80 to about 160° C.

The mold-surface of the outer and inner molds may or may not have the same temperature provided the difference between outer mold surface and inner mold surface does not exceed about 20° C.

A mold compression pressure is usually in the range of about 20 to about 100 kg/cm$^2$. When the pressure is lower than about 20 kg/cm$^2$, defects such as inner cracks tend to be caused, and surface defects may be caused on the surface of the molded article by boiling of methyl methacrylate contained in the material to be molded. On the other hand, when the pressure is over about 100 kg/cm², the material to be molded may flow undesirably out of the mold during compression.

The molding conditions such as the temperature of the mold, the mold compression pressure, a rate of a mold compression and a place at which the material to be molded is thrown into the mold are selected depending on the shape of the molded article and the period of time needed for producing the molded article.

When injection molding or transfer molding is carried out, an injection molding apparatus or a transfer molding apparatus comprising an injection unit and a mold compression unit is used.

A suitable screw used for a measurement or a injection has a pressure ratio of 1.5 or less. The screw may have a back-flow-preventing ring, which can be of a various structure, in vicinity of the top.

Temperature of a cylinder covering a screw and of a pipe for transfer of transfer molding is preferably controlled at about 60° C. or less. When the temperature is over about 60° C., a local-temperature increase may take place due to shearing heat generation between the screw and the cylinder or in the pipe during the transfer, and a curing reaction of the material may be initiated, undesirably.

When injection molding or transfer molding is carried out, temperature of the mold is controlled to be in the range of about 80 to about 160° C. The mold-surface of the outer and inner molds may or may not have the same temperature provided the difference between outer mold surface and inner mold surface does not exceed about 20° C.

A mold compression pressure and a clearance between molds may be controlled constantly, or may be controlled continuously or gradually depending on the progress of the curing reaction.

The molding conditions of injection molding and transfer molding such as the temperature of the mold, the mold compression pressure, a rate of a mold compression and a place at which the material to be molded is added into the mold are also selected depending on the shape of the molded article and the period of time needed for producing the molded article.

As described above, the molded article is thus obtained in the present invention. The molded article has a high hardness of the surface and an excellent scratch-resistance. The surface hardness thereof can be at least 3H, and is usually 4H or more of the pencil hardness. In addition, the molded article has an excellent appearance without any defects such as cracks.

The molded article of the present invention can be used in variety of fields. Examples of the fields include automobile-related parts such as a tail-lamp cover, head-lamp cover, a meter panel, various windows and components for mirrors, construction materials such as commonly used windows and boards for room-compartments, coating materials used for, for example, a bath tub or a washstand, kitchenware such as resin tableware, parts for appliances concerning running-water such as windows of microwave ovens, protecting front panels used for, for example, a liquid crystal display, other front panels for displays or various kinds of monitors, covers for various machines, lenses such as fresnel lenses, lenses for a watch and lenses for glasses, disk substrates used for, for example, compact disks or digital-video disks, covers for hot-water apparatuses using solar energy, protecting covers for solar batteries and various signboards.

The molded article of the present invention has a high transparency and an excellent weather-resistance as well as a high hardness of the surface and an excellent scratch-resistance and, therefore, may be preferably used in the fields wherein properties such as a high transparency, an excellent weather-resistance and an excellent scratch-resistance are needed. Especially, the molded article is preferably used as a lamp cover in the various fields such as automobile, shipping, airline system, outdoor apparatuses and signals. Specific examples of the usage thereof include materials of covers for lamps such as a tail lamp, a head lamp, a fog lamp, a halogen lamp, a metal halide lamp, a xenon lamp, a fluorescence mercury lamp and sodium lamp.

As described above, the present invention provides methyl methacrylic resin compositions which have little amount of scattering in the content and an excellent preservative property, and is able to give a molded article which has a high transparency, a high hardness of the surface and an excellent scratch-resistance. The material to be molded comprising said methyl methacrylic resin composition is excellent in view of a handling property and a molding property, and can give an excellent molded article having a good appearance. According to the present invention, the molded article which has a high transparency, a high hardness of the surface and an excellent scratch-resistance can be steadily and easily processed. The present invention may be preferably used in the fields wherein properties such as a high transparency, an excellent weather-resistance and an excellent scratch-resistance are needed, for example, in the field of a lamp cover.

The entire disclosure of the Japanese Patent Application No. 9-212942 filed on Aug. 7, 1997 and the Japanese Patent Application No. 10-73917 filed on Mar. 23, 1998, both indicating specification, claims and summary, are incorporated herein by reference in their entirety.

EXAMPLES

The present invention is described in more detail by reference to the following Examples, which should not be construed as a limitation upon the scope of the present invention.

In the Examples, the measurement of physical properties was conducted by the following methods.

(1) Handling Property of the Material to be Molded

A handling property of the obtained material to be molded was evaluated by the extent of stickiness thereof, which is determined by a method of touching while wearing a polyethylene glove.

(2) Molding Property of the Material to be Molded 80 g of the obtained material to be molded was thrown into a plate-form mold of 120×120×20 mm, and was subjected to thermal compression molding for 10 minutes under conditions of a temperature of 120° C. and a mold compression pressure of 70 kg/cm² to obtain a molded article. A molding property of the material to be molded was evaluated by the appearance of the obtained molded article.

(3) Preservation Property of the Material to be Molded

A material to be molded was formed to be two plates having a thickness of about 5 mm. Between these plates, a thermocouple was placed. The thermocouple and the two plates were wrapped in aluminum foil and were placed in an air-oven at 90° C. to carry out a test of a preservation property of the material to be molded. The change of temperature was traced. A length of time needed for showing the maximum of calorification due to the polymerization was measured and the length of time gave a criterion for judgment of a preservation property of the material to be molded. The longer period of time means that the material to be molded has the better preservation property.

(4) Scratch-Resistance of a Molded Article

According to the pencil-scratching test of the Japanese Standards Association JIS-K5400 method, a hardness of a molded material surface was evaluated by a measurement of a pencil hardness, which corresponds to the hardness of the surface. The larger pencil hardness means that the obtained molded article has the more excellent scratch-resistance.

(5) Transparency of a Molded Article

In the following Examples 1 to 6 and Comparative Examples 1 to 2, the molded articles were obtained by the same method that is described in the above (2) "Molding property of the material to be molded". The obtained molded articles were cut out into the square-form of 4×4 cm and the total light transmission thereof was measured with a haze-meter to evaluate the transparency of the obtained molded articles.

In the following Examples 7 and 8, the total light transmission of the obtained lamp covers was measured according to the Japanese Standards Association JIS-K7105 method to evaluate the transparency of the obtained lamp covers.

(6) Weather-Resistance

In the following Examples 7 and 8, a weather-resistance test was conducted by exposing the obtained lamp covers to light, using Sunshine wether-ometer (manufactured by Suga Test Instruments Co, Lit.) The test was carried out at 63° C. for 1000 hours, using a carbon-arc lamp as a light source while water was atomized for 18 minutes in every 2 hours. After the test, the total light transmission of the obtained lamp covers was measured. The weather-resistance of the lamp cover was evaluated on basis of the difference of the total light transmission thereof and the eye-estimated changes of appearance of the lamp cover, such as coloring, before and after the exposure.

Example 1

Into a 1000 round-bottom flask were charged 28 parts by weight of neopentyl glycol dimethacrylate (NK ester NPG, manufactured by SHIN-NAKAMURA CHEMICAL CO., LTD.), 22 parts by weight of methyl methacrylate, 50 parts by weight of a partially cross-linked resin particle (Techpolymer MBX-5, manufactured by Sekisui Chemical Co, Ltd., in which non-dissolved material with acetone is 94.6%) and 0.23 parts by weight of t-butyl peroxyisopropyl carbonate as a polymerization initiator, and the resulting mixture was stirred and mixed to obtain a methyl methacrylic resin composition in the form of slurry.

After being deformed under the reduced pressure, the resin composition was poured into a polyethylene container, and then sealed in a bag, and left in a hot air dryer at 60° C. for 7 hours for aging. The resin composition was cooled down to room temperature, then, the bag and the container were removed to obtain a material to be molded in the form of clay.

This material had little stickiness and a good handling property. A molded article was obtained by using the material. The appearance of the article was excellent without defects such as cracking and, therefore, it was recognized that the material to be molded has a good molding property. The pencil hardness of the article surface was 5H and the total light transmission of the article was 92.3% and, therefore, it was recognized that the article has an excellent scratch-resistance and high transparency.

A test of a preservation property of the material to be molded was conducted. A long period of time was needed for showing the maximum of calorification due to the polymerization, of 41 minutes and, therefore, it was recognized that the material to be molded has an excellent preservation property.

Example 2

The same procedure as in Example 1 was conducted except that 50 parts by weight of SUMIPEX XC-1A (manufactured by Sumitomo Chemical Co., Ltd., in which non-dissolved material with acetone is 78.6%) was used as a partially cross-linked resin particle instead of Techpolymer MBX-5 (manufactured by Sekisui Chemical Co, Ltd.), to obtain a material to be molded in the form of clay.

This material had little stickiness and a good handling property. A molded article was obtained by using the material. The appearance of the article was excellent without defects such as cracking and, therefore, it was recognized that the material to be molded has a good molding property. The pencil hardness of the article surface was 4H and the total light transmission of the article was 92.2% and, therefore, it was recognized that the article has an excellent scratch-resistance and high transparency.

A test of a preservation property of the material to be molded was conducted. A long period of time was needed for showing the maximum of calorification due to the polymerization, of 46 minutes and, therefore, it was recognized that the material to be molded has an excellent preservation property.

Example 3

The same procedure as in Example 2 was conducted except that 36 parts by weight of diethylene glycol dimethacrylate (NK ester 2G, manufactured by SHIN-NAKAMURA CHEMICAL CO., LTD.) was used instead of neopentyl glycol dimethacrylate and the amount of methyl methacrylate was changed to 14 parts by weight to obtain a material to be molded in the form of clay.

This material had little stickiness and a good handling property. A molded article was obtained by using the material. The appearance of the article was excellent without defects such as cracking and, therefore, it was recognized that the material to be molded has a good molding property. The pencil hardness of the article surface was 4H and the total light transmission of the article was 90.7% and, therefore, it was recognized that the article has an excellent scratch-resistance and high transparency.

A test of a preservation property of the material to be molded was conducted. A long period of time was needed for showing the maximum of calorification due to the polymerization, of 50 minutes and, therefore, it was recognized that the material to be molded has an excellent preservation property.

Example 4

The same procedure as in Example 2 was conducted except that the amount of the partially cross-linked resin particle, SUMIPEX XC-1A, was changed to 34 parts by weight, and an uncross-linked resin particle, SUMIPEX MHF (manufactured by Sumitomo Chemical Co., Ltd.) was additionally used in an amount of 16 parts by weight, to obtain a material to be molded in the form of clay.

This material had little stickiness and a good handling property. A molded article was obtained by using the material. The appearance of the article was excellent without defects such as cracking and, therefore, it was recognized that the material to be molded has a good molding property. The pencil hardness of the article surface was 4H and the total light transmission of the article was 93.9% and, therefore, it was recognized that the article has an excellent scratch-resistance and high transparency.

A test of a preservation property of the material to be molded was conducted. A long period of time was needed for showing the maximum of calorification due to the polymerization, of 45 minutes and, therefore, it was recognized that the material to be molded has an excellent preservation property.

Example 5

The same procedure as in Example 4 was conducted except that the amount of the partially cross-linked resin particle, SUMIPEX XC-1A, was changed to 49 parts by weight, and the amount of the uncross-linked resin particle, SUMIPEX MHF, was changed to 1 part by weight, to obtain a material to be molded in the form of clay.

This material had little stickiness and a good handling property. A molded article was obtained by using the material. The appearance of the article was excellent without defects such as cracking and, therefore, it was recognized that the material to be molded has a good molding property. The pencil hardness of the article surface was 5H and the total light transmission of the article was 93.7% and, therefore, it was recognized that the article has an excellent scratch-resistance and high transparency.

A test of a preservation property of the material to be molded was conducted. A long period of time was needed for showing the maximum of calorification due to the polymerization, of 45 minutes and, therefore, it was recognized that the material to be molded has an excellent preservation property.

Example 6

The same procedure as in Example 4 was conducted except that the amount of the partially cross-linked resin particle, SUMIPEX XC-1A, was changed to 47.5 parts by weight, and the amount of the uncross-linked resin particle, SUMIPEX MHF, was changed to 2.5 parts by weight, to obtain a material to be molded in the form of clay.

This material had little stickiness and a good handling property. A molded article was obtained by using the material. The appearance of the article was excellent without defects such as cracking and, therefore, it was recognized that the material to be molded has a good molding property. The pencil hardness of the article surface was 5H and the total light transmission of the article was 93.7% and, therefore, it was recognized that the article has an excellent scratch-resistance and high transparency.

A test of a preservation property of the material to be molded was conducted. A long period of time was needed for showing the maximum of calorification due to the polymerization, of 45 minutes and, therefore, it was recognized that the material to be molded has an excellent preservation property.

Comparative Example 1

The stirring and mixing were conducted in the same manner as in Example 2 except that methyl methacrylate was used instead of neopentyl glycol dimethacrylate, that is, the total amount of methyl methacrylate was changed to 50 parts by weight and neopentyl glycol dimethacrylate was not used. Flowability was lost during the stirring, and uniform mixing became impossible.

The resulting mixture was poured, as it was, into a polyethylene container, and then sealed in a bag, and left in a hot air dryer at 60° C. for 7 hours for aging. The resin composition was cooled down to room temperature, then, the bag and the container were removed to obtain a material to be molded.

The material was in the wet-chalk-like form and the handling property was not good. The material generated strong odor of methyl methacrylate. The thermal compression molding was conducted in the same manner as in Example 1, to obtain a molded article. The article had a lot of parts where the curing was not enough, and the article had a lot of cracks.

A test of a preservation property of the material to be molded was conducted. A short period of time was needed for showing the maximum of calorification due to the polymerization, of 31 minutes and, therefore, it was recognized that the material to be molded does not have a enough preservation property.

Comparative Example 2

Into a 1000 ml round-bottom flask were charged 20 parts by weight of neopentyl glycol dimethacrylate (NK ester NPG, manufactured by SHIN-NAKAMURA CHEMICAL CO., LTD.) and 80 parts by weight of methyl methacrylate including 9% by weight of polymethyl methacrylate having an average polymerization degree of about 13,000. Into the mixture were added 0.0025% by weight of cumyl peroxydecanoate, 0.2% by weight of di-t-butyl peroxide and 0.01% by weight of 2,3-dimethyl-2,3-dipehnylbutane and the resulting mixture was stirred and mixed to obtain a methyl methacrylic resin composition.

This resin composition was poured into a cell comprising glass plates (thickness: 5 mm) and a gasket made of vinyl chloride resin inserted between the glass plates so that the clearance between them was 5 mm, and left in a water bath at 60° C. for 2.5 hours for aging. The composition was cooled down to room temperature, then, the glass plates were removed to obtain a partially polymerized material in the form of gel.

A test of a preservation property of the material to be molded was conducted. A short period of time was needed for showing the maximum of calorification due to the polymerization, of 26 minutes and, therefore, it was recognized that the material to be molded does not have a enough preservation property.

Example 7

Into a 1000 ml round-bottom flask were charged 28 parts by weight of neopentyl glycol dimethacrylate, NK ester NPG, 22 parts by weight of methyl methacrylate, 36 parts by weight of the partially cross-linked resin particle, SUMIPEX XC-1A, 14 parts by weight of the uncross-linked resin particle, SUMIPEX MHF and 0.23 parts by weight of t-butyl peroxyisopropyl carbonate as a polymerization initiator, and the resulting mixture was stirred and mixed to obtain a methyl methacrylic resin composition in the form of slurry.

After being deformed under the reduced pressure, the resin composition was sandwiched between glass plates (thickness: 5 mm) carrying on inner surface thereof a polyethylene film pasted, and the surroundings thereof were sealed by a gasket made of a vinyl chloride resin inserted between the glass plates so that the clearance between them was 5 mm, and left in a hot air dryer at 60° C. for 7 hours for aging. The composition was cooled down to room temperature, then, the glass plates and the polyethylene film were removed to obtain a material to be molded in the form of clay.

This material had little stickiness and a good handling property. 80 g of the obtained material to be molded was thrown into a plate-form mold of 120×120×20 mm, and was subjected to thermal compression molding for 10 minutes under conditions of a temperature of 120° C. and a mold compression pressure of 70 kg/cm² to obtain a lamp cover. The appearance of the lamp cover was excellent without defects such as cracking and, therefore, it was recognized that the material to be molded has a good molding property. The pencil hardness of the lamp cover surface was 4H and the total light transmission of the lamp cover was 93.0% and, therefore, it was recognized that the lamp cover has an excellent scratch-resistance and high transparency.

A weather-resistance test was conducted by exposing the obtained lamp cover to light. After the 1000-hour exposure, the lamp cover kept high transparency, of 92.6% of the total light transmission and any changes, such as coloring, was not observed in appearance of the lamp cover before and after the exposure.

Example 8

Into a kneader were charged 25 parts by weight of neopentyl glycol dimethacrylate, NK ester NPG, 20 parts by weight of methyl methacrylate, 40 parts by weight of the partially cross-linked resin particle, SUMIPEX XC-1A, 15 parts by weight of the uncross-linked resin particle, SUMIPEX MHF and 0.23 parts by weight of t-butyl peroxyisopropyl carbonate as a polymerization initiator, and the resulting mixture was kneaded for 2 hours, while keeping a temperature of 70° C. with a circulation of hot-water. The kneaded mixture was cooled down to room temperature to obtain a material to be molded in the form of clay.

This material had little stickiness and a good handling property. The obtained material to be molded was thrown into a injection molding apparatus for a thermosetting resin having a plate-form mold for lamp cover of 120×120×20 mm, and was subjected to injection molding at a mold temperature of 135° C. to obtained a lamp cover. The appearance of the lamp cover was excellent without defects such as cracking and, therefore, it was recognized that the material to be molded has a good molding property. The pencil hardness of the lamp cover surface was 4H and the total light transmission of the lamp cover was 92.5% and, therefore, it was recognized that the lamp cover has an excellent scratch-resistance and high transparency.

A weather-resistance test was conducted by exposing the obtained lamp cover to light. After the 1000-hour exposure, the lamp cover kept high transparency, of 91.8% of the total light transmission and any changes, such as coloring, was not observed in appearance of the lamp cover before and after the exposure.

What is claimed is:

1. A methyl methacrylic resin composition comprising:
   (A) 30 to 60% by weight of an unsaturated monomer mixture comprising an unsaturated monomer having at least two double bonds which can effect radical polymerization,
   (B) 40 to 70% by weight of resin particles made of a polymer of a methyl methacrylic unsaturated monomer comprising (i) 20 to 100 parts by weight of partially cross-linked resin particles and (ii) 0 to 80 parts by weight of uncross-linked resin particles, wherein the total amount of the partially cross-linked resin particles and the uncross-linked resin particles adds up to 100 parts by weight and
   (C) 0.1 to 5% by weight of a radical polymerization initiator,
   wherein the amount of each of components (A), (B) and (C) is based on the total amount of components (A) and (B).

2. A resin composition according to claim 1, wherein the unsaturated monomer mixture comprises 50% by weight or more of the unsaturated monomer having at least two double bonds which can effect radical polymerization.

3. A resin composition according to claim 1 or 2, wherein component (B) consists of resin particles made of a polymer of a methyl methacrylic unsaturated monomer consisting of partially cross-linked resin particles.

4. A resin composition according to claim 1 or 2, wherein component (B) consists of resin particles made of a polymer of a methyl methacrylic unsaturated monomer comprising (i) 60 to 80 parts by weight of partially cross-linked resin particles and (ii) 20 to 40 parts by weight of uncross-linked resin particles, wherein the total amount of the partially cross-linked resin particles and the uncross-linked resin particles adds up to 100 parts by weight.

5. A resin composition according to any one of claims 1 or 2, wherein the unsaturated monomer having at least two double bonds which can effect radical polymerization is an unsaturated monomer having at least two methacryloxy groups.

6. A resin composition according to any one of claims 1 or 2, wherein the partially cross-linked resin particles have an average particle size of 1 to 100 μm.

7. A resin composition according to any one of claims 1 or 2, wherein the polymerization initiator has a 10-hour half-life temperature of 60° C. or higher.

8. A resin composition according to any one of claims 1 or 2, wherein the unsaturated monomer mixture comprises 50% by weight or more of the unsaturated monomer having at least two double bonds which can effect radical polymerization, the unsaturated monomer having at least two double bonds is an unsaturated monomer having at least two methacryloxy groups, the partially cross-linked resin particles have an average particle size of 1 to 100 μm and the polymerization initiator has a 10-hour half-life temperature of 60 to 100° C.

9. A resin composition according to any one of claims 1 or 2, wherein the unsaturated monomer having at least two double bonds which can effect radical polymerization is neopentyl glycol dimethacrylate.

10. A resin composition according to claim 1, which comprises an ultraviolet-ray absorbing agent in an amount of 10 to 1000 ppm based on the total amount of components (A), (B) and (C).

11. A method for producing a molded article comprising steps of:
    (I) mixing and aging a methyl methacrylic resin composition comprising:
       (A) 30 to 60% by weight of an unsaturated monomer mixture comprising an unsaturated monomer having at least two double bonds which can effect radical polymerization,
       (B) 40 to 70% by weight of resin particles made of a polymer of a methyl methacrylic unsaturated monomer comprising (i) 20 to 100 parts by weight of partially cross-linked resin particles and (ii) 0 to 80 parts by weight of uncross-linked resin particles, wherein the total amount of the partially cross-linked resin particles and the uncross-linked resin particles adds up to 100 parts by weight and (C) 0.1 to 5% by weight of a radical polymerization initiator, wherein the amount of each of components (A), (B) and (C) is based on the total amount of components (A) and (B), to obtain a material to be molded, and (II) polymerizing and curing the material.

12. A method for producing a molded article according to claim 11, wherein a methyl methacrylic resin composition comprises the unsaturated monomer having at least two double bonds which can effect radical polymerization is an unsaturated monomer having at least two methacryloxy groups, the partially cross-linked resin particles having an average particle size of 1 to 100 μm, and the polymerization initiator having a 10-hour half-life temperature of 60° C. or higher.

13. A method according to claim 11 or 12, wherein the polymerizing and curing is conducted by an injection molding method, a compression molding method or a transition molding method.

14. A method according to claim 11 or 12, wherein the aging is conducted at a temperature of 20° C. to 80° C.

15. A method according to claim 11 or 12, wherein the polymerizing and curing is conducted at a temperature of 80° C. to 160° C.

16. A method according to claim 11 or 12, wherein the aging is conducted at a temperature of 20° C. to 80° C. and the polymerizing and curing is conducted at a temperature of 80° C. to 160° C.

17. A methyl methacrylic resin composition comprising:
(A) 30 to 60% by weight of an unsaturated monomer mixture comprising an unsaturated monomer having at least two double bonds which can effect radical polymerization,
(B) 40 to 70% by weight of resin particles made of a polymer of a methyl methacrylic unsaturated monomer comprising (i) 50 to 100 parts by weight of partially cross-linked resin particles and (ii) 0 to 50 parts by weight of uncross-linked resin particles, wherein the total amount of the partially cross-linked resin particles and the uncross-linked resin particles adds up to 100 parts by weight and
(C) 0.1 to 5% by weight of a radical polymerization initiator,
wherein the amount of each of components (A), (B) and (C) is based on the total amount of components (A) and (B).

18. A method for producing a molded article comprising steps of:
(I) mixing and aging a methyl methacrylic resin composition comprising:
(A) 30 to 60% by weight of an unsaturated monomer mixture comprising an unsaturated monomer having at least two double bonds which can effect radical polymerization,
(B) 40 to 70% by weight of resin particles made of a polymer of a methyl methacrylic unsaturated monomer comprising (i) 50 to 100 parts by weight of partially cross-linked resin particles and (ii) 0 to 50 parts by weight of uncross-linked resin particles, wherein the total amount of the partially cross-linked resin particles and the uncross-linked resin particles adds up to 100 parts by weight and
(C) 0.1 to 5% by weight of a radical polymerization initiator,
wherein the amount of each of components (A), (B) and (C) is based on the total amount of components (A) and (B), to obtain a material to be molded, and
(II) polymerizing and curing the material.

19. A methyl methacrylic resin composition according to claim 17 comprising:
(A) 30 to 60% by weight of an unsaturated monomer mixture comprises about 50% by weight or more based on the unsaturated monomer mixture of the unsaturated monomer having at least two double bonds which can effect radical polymerization,
(B) 40 to 70% by weight of resin particles made of a polymer of a methyl methacrylic unsaturated monomer comprising (i) 50 to 100 parts by weight of partially cross-linked resin particles and (ii) 0 to 50 parts by weight of uncross-linked resin particles, wherein the total amount of the partially cross-linked resin particles and the uncross-linked resin particles adds up to 100 parts by weight and
(C) 0.1 to 5% by weight of a radical polymerization initiator,
wherein the amount of each of components (A), (B) and (C) is based on the total amount of components (A) and (B).

20. A method for producing a molded article according to claim 18 comprising steps of:
(I) mixing and aging a methyl methacrylic resin composition comprising:
(A) 30 to 60% by weight of an unsaturated monomer mixture comprises about 50% by weight or more based on the unsaturated monomer mixture of the unsaturated monomer having at least two double bonds which can effect radical polymerization,
(B) 40 to 70% by weight of resin particles made of a polymer of a methyl methacrylic unsaturated monomer comprising (i) 50 to 100 parts by weight of partially cross-linked resin particles and (ii) 0 to 50 parts by weight of uncross-linked resin particles, wherein the total amount of the partially cross-linked resin particles and the uncross-linked resin particles adds up to 100 parts by weight and
(C) 0.1 to 5% by weight of a radical polymerization initiator,
wherein the amount of each of components (A), (B) and (C) is based on the total amount of components (A) and (B), to obtain a material to be molded, and
(II) polymerizing and curing the material.

21. A resin composition according to claim 1 or 2 wherein the resin particles made of polymer of a methyl methacrylic unsaturated monomer are made from about 50% by weight or more of methyl methacrylate based on the total weight of the resin particles.

* * * * *